(12) United States Patent
Chen et al.

(10) Patent No.: US 10,067,494 B2
(45) Date of Patent: Sep. 4, 2018

(54) HYBRID COMPUTER NUMERICAL CONTROL MACHINING CENTER AND MACHINING METHOD THEREOF

(71) Applicant: TONGTAI MACHINE & TOOL CO., LTD., Luzhu Kaohsiung (CN)

(72) Inventors: Hsinpao Chen, Luzhu Kaohsiung (CN); Huaien Kao, Luzhu Kaohsiung (CN); Zongshin Liu, Luzhu Kaohsiung (CN); Tsunghsien Tsai, Luzhu Kaohsiung (CN); Tingchang Chen, Luzhu Kaohsiung (CN); Juihsiung Yen, Luzhu Kaohsiung (CN)

(73) Assignee: Tongtai Machine & Tool Co., Ltd., Luzhu Kaohsiung (TW)

(*) Notice: Subject to any disclaimer, the term of this patent is extended or adjusted under 35 U.S.C. 154(b) by 30 days.

(21) Appl. No.: 15/514,396

(22) PCT Filed: Mar. 17, 2015

(86) PCT No.: PCT/CN2015/074365
§ 371 (c)(1),
(2) Date: Mar. 24, 2017

(87) PCT Pub. No.: WO2016/138676
PCT Pub. Date: Sep. 9, 2016

(65) Prior Publication Data
US 2017/0293284 A1    Oct. 12, 2017

(30) Foreign Application Priority Data
Mar. 2, 2015 (CN) .......................... 2015 1 0092502

(51) Int. Cl.
*G06F 19/00* (2018.01)
*G05B 19/18* (2006.01)
(Continued)

(52) U.S. Cl.
CPC ........ *G05B 19/182* (2013.01); *B23K 26/0093* (2013.01); *G05B 19/4187* (2013.01)

(58) Field of Classification Search
CPC combination set(s) only.
See application file for complete search history.

(56) References Cited

U.S. PATENT DOCUMENTS

| 4,149,235 A | * | 4/1979 | Froyd | .................... G05B 19/05 700/169 |
| 5,345,057 A | | 9/1994 | Muller | |

(Continued)

FOREIGN PATENT DOCUMENTS

| CN | 1660538 A | 8/2005 |
| CN | 1688408 A | 10/2005 |

(Continued)

*Primary Examiner* — Kidest Bahta
(74) *Attorney, Agent, or Firm* — Muncy, Geissler, Olds & Lowe, P.C.

(57) ABSTRACT

A hybrid computer numerical control (CNC) machining center and a machining method thereof are provided. The hybrid CNC machining center has at least a cutting tool head, a laser cladding tool head, a laser surface heat treatment tool head, and a computer numerical control unit. The cutting tool head, the laser cladding tool head, and the laser surface heat treatment tool head are alternately installed in a tool holder of the hybrid CNC machining center. Users can accomplish cutting, laser cladding, and laser surface heat treatment operations for a work-piece just in one single machine, so that the work-piece is unnecessary to be moved between different machines. Therefore, the steps and the process time of the machining operations are substantially simplified.

8 Claims, 5 Drawing Sheets

(51) Int. Cl.
*G05B 19/418* (2006.01)
*B23K 26/00* (2014.01)

(56) References Cited

U.S. PATENT DOCUMENTS

| | | |
|---|---|---|
| 6,605,795 B1 | 8/2003 | Arcella et al. |
| 7,002,100 B2 | 2/2006 | Wu et al. |
| 8,878,094 B2 | 11/2014 | Bagavath-Singh |
| 9,221,216 B2 * | 12/2015 | Chen .................... B29C 64/135 |
| 2002/0091460 A1 * | 7/2002 | Allen ................. G05B 19/4166 |
| | | 700/173 |
| 2005/0184032 A1 | 8/2005 | Yamazaki et al. |
| 2006/0032840 A1 | 2/2006 | Bagavath-Singh |
| 2017/0173747 A1 | 6/2017 | Jones et al. |

FOREIGN PATENT DOCUMENTS

| | | |
|---|---|---|
| CN | 101691010 A | 4/2010 |
| CN | 102323756 A | 1/2012 |
| CN | 102513694 A | 6/2012 |
| CN | 103600155 A | 2/2014 |
| CN | 103604813 A | 2/2014 |
| CN | 203804367 U | 9/2014 |
| EP | 1859893 A1 | 11/2007 |
| JP | H08206859 A | 8/1996 |
| JP | H11114741 A | 4/1999 |
| JP | 2005014027 A | 1/2005 |
| TW | 580416 B | 3/2004 |
| TW | I232144 B | 5/2005 |
| WO | 2014013247 A2 | 1/2014 |

\* cited by examiner

HYBRID COMPUTER NUMERICAL CONTROL MACHINING CENTER AND MACHINING METHOD THEREOF

FIELD OF THE INVENTION

The present invention relates to a computer numerical control (CNC) machining center and a machining method thereof, and more particularly to a hybrid CNC machining center and a machining method thereof with a laser cladding tool head and a laser surface heat treatment tool head.

BACKGROUND OF THE INVENTION

A traditional computer numerical control (CNC) machining center can process various cutting operations by changing different cutting tool heads, but only the cutting operations are processed. When a welding (repair welding) or heat treatment operation is necessary to be pressed therewith, it must use other machine tools, so that the steps and the process time of the machining operations are substantially increased.

Especially, for a machining method using laser, such as a laser cladding or laser surface heat treatment operation, it must use special laser machine tools to work. Therefore, if the laser machine tool is necessary to be used in entire of the machining processes, a work-piece is moved, fixed, and machined in different machine tools, so that a dismount-move-fix-machining process is repeated. Thus, such machining processes will substantially increase the steps and the process time of the machining operations.

For improving the above-mentioned defects, it is necessary to provide an improved hybrid CNC machining center and a machining method thereof, so as to solve the problems existing in the conventional technologies.

SUMMARY OF THE INVENTION

The object of the present invention is to provide a machining method of a hybrid computer numerical control (CNC) machining center. Users can accomplish cutting, laser cladding, and laser surface heat treatment operations for a work-piece just in one single machine, so that the work-piece is unnecessary to be moved between different machines. Therefore, the steps and the process time of the machining operations are substantially simplified.

In order to accomplish the above-mentioned object, the present invention provides a machining method of a hybrid CNC machining center, which comprises steps of:
providing a hybrid CNC machining center including at least a cutting tool head, a laser cladding tool head, a laser surface heat treatment tool head, and a computer numerical control unit, wherein the cutting tool head, the laser cladding tool head and the laser surface heat treatment tool head are alternately installed in a tool holder of the hybrid CNC machining center;
processing a first cutting operation, wherein the cutting tool head is configured to cut at least a machined surface of a work-piece;
processing a cladding operation, wherein the laser cladding tool head is configured to clad the machined surface;
processing a second cutting operation, wherein the cutting tool head is configured to cut the cladded machined surface; and
processing a surface heat treatment operation, wherein the laser surface heat treatment tool head is configured to heat treat the machined surface.

In one embodiment of the present invention, the laser cladding tool head further includes a temperature sensor and a camera; and during the step of processing the cladding operation,
firstly detecting a temperature of a molten pool of the machined surface by the temperature sensor, and providing the detected temperature of the molten pool to the computer numerical control unit, wherein if the temperature of the molten pool is under a default temperature, a power of the laser cladding tool head is increased; and if the temperature of the molten pool is over the default temperature, the power of the laser cladding tool head is decreased; and
then detecting a lightness and profile of the molten pool of the machined surface by the camera, and providing the detected lightness and profile of the molten pool to the computer numerical control unit, wherein if the lightness and profile of the molten pool is under a default condition, the power of the laser cladding tool head is increased; and if the lightness and profile of the molten pool is over the default condition, the power of the laser cladding tool head is decreased.

In one embodiment of the present invention, the laser surface heat treatment tool head further includes a temperature sensor; and during the step of processing the heat treatment operation, detecting a temperature of the machined surface by the temperature sensor, and providing the detected temperature of the machined surface to the computer numerical control unit, wherein if the temperature of the machined surface is under a default temperature, a power of the laser surface heat treatment tool head is increased; and if the temperature of the machined surface is over the default temperature, the power of the laser surface heat treatment tool head is decreased.

In one embodiment of the present invention, the hybrid CNC machining center further comprises a contact or non-contact type detecting tool head, which is configured to detect a completeness of the cladded machined surface, wherein if the completeness of the cladded machined surface is achieved, a following step is processed; and if the completeness of the cladded machined surface is not achieved, the cladding operation is processed again.

In order to accomplish the above-mentioned object, the present invention further provides a machining method of a hybrid CNC machining center, comprises steps of:
providing a hybrid CNC machining center including at least a cutting tool head, a laser cladding tool head, and a computer numerical control unit, wherein the cutting tool head and the laser cladding tool head are alternately installed in a tool holder of the hybrid CNC machining center;
processing a cutting operation, wherein the cutting tool head is configured to cut at least a machined surface of a work-piece; and
processing a cladding operation, wherein the laser cladding tool head is configured to clad the machined surface;
wherein the laser cladding tool head further includes a temperature sensor and a camera; and during the step of processing the cladding operation,
firstly detecting a temperature of a molten pool of the machined surface by the temperature sensor, and providing the detected temperature of the molten pool to the computer numerical control unit, wherein if the temperature of the molten pool is under a default temperature, a power of the laser cladding tool head is increased; and if the temperature of the molten pool is over the default temperature, the power of the laser cladding tool head is decreased; and then detecting a lightness and profile of the molten pool of the machined surface by the camera, and providing the detected lightness and profile of the molten pool to the computer numerical control unit, wherein if the lightness and profile of the molten pool is under a default condition, the power of the laser cladding tool head is increased; and if the lightness and profile of the molten pool is over the default condition, the power of the laser cladding tool head is decreased.

In one embodiment of the present invention, the hybrid CNC machining center further comprises a contact or non-contact type detecting tool head, which is configured to detect a completeness of the cladded machined surface, wherein if the completeness of the cladded machined surface is achieved, the following step is processed; and if the completeness of the cladded machined surface is not achieved, the cladding operation is processed again.

In one embodiment of the present invention, the hybrid CNC machining center further comprises a laser surface heat treatment tool head, which is configured to process a surface heat treatment operation to the cladded machined surface after the cladding operation.

In one embodiment of the present invention, the laser surface heat treatment tool head further includes a temperature sensor; and during the step of processing the heat treatment operation, detecting a temperature of the machined surface by the temperature sensor, and providing the detected temperature of the machined surface to the computer numerical control unit, wherein if the temperature of the machined surface is under a default temperature, a power of the laser surface heat treatment tool head is increased; and if the temperature of the machined surface is over the default temperature, the power of the laser surface heat treatment tool head is decreased.

In order to accomplish the above-mentioned object, the present invention provides a machining method of a hybrid CNC machining center, comprises steps of:

providing a hybrid CNC machining center including at least a cutting tool head, a laser surface heat treatment tool head, and a computer numerical control unit, wherein the cutting tool head and the laser surface heat treatment tool head are alternately installed in a tool holder of the hybrid CNC machining center;

processing a cutting operation, wherein the cutting tool head is configured to cut at least a machined surface of a work-piece; and processing a surface heat treatment operation, wherein the laser surface heat treatment tool head is configured to heat treat the machined surface.

In one embodiment of the present invention, the laser surface heat treatment tool head further includes a temperature sensor; and during the step of processing the heat treatment operation, detecting a temperature of the machined surface by the temperature sensor, and providing the detected temperature of the machined surface to the computer numerical control unit, wherein if the temperature of the machined surface is under a default temperature, a power of the laser surface heat treatment tool head is increased; and if the temperature of the machined surface is over the default temperature, the power of the laser surface heat treatment tool head is decreased.

The object of the present invention is to provide a CNC machining center. Users can accomplish cutting, laser cladding, and laser surface heat treatment operations for a work-piece just in one single machine, so that the work-piece is unnecessary to be moved between different machines. Therefore, the steps and the process time of the machining operations are substantially simplified.

In order to accomplish the above-mentioned object, the present invention provides a hybrid CNC machining center, comprises: at least a cutting tool head, a laser cladding tool head, a laser surface heat treatment tool head, and a computer numerical control unit, wherein the cutting tool head, the laser cladding tool head and the laser surface heat treatment tool head are alternately installed in a tool holder of the hybrid CNC machining center; and wherein the cutting tool head is configured to cut at least a machined surface of a work-piece; the laser cladding tool head is configured to clad the machined surface; and the laser surface heat treatment tool head is configured to heat treat the machined surface.

In one embodiment of the present invention, the laser cladding tool head further includes a temperature sensor and a camera; and during processing a cladding operation, the temperature sensor firstly detects a temperature of a molten pool of the machined surface, and provides the detected temperature of the molten pool to the computer numerical control unit, wherein if the temperature of the molten pool is under a default temperature, a power of the laser cladding tool head is increased; and if the temperature of the molten pool is over the default temperature, the power of the laser cladding tool head is decreased; and the camera then detects a lightness and profile of the molten pool of the machined surface, and provides the detected lightness and profile of the molten pool to the computer numerical control unit, wherein if the lightness and profile of the molten pool is under a default condition, a power of the laser cladding tool head is increased; and if the lightness and profile of the molten pool is over the default condition, the power of the laser cladding tool head is decreased.

In one embodiment of the present invention, the laser surface heat treatment tool head further includes a temperature sensor; and during processing a heat treatment operation, the temperature sensor detects a temperature of the machined surface, and provides the detected temperature of the machined surface to the computer numerical control unit, wherein if the temperature of the machined surface is under a default temperature, a power of the laser surface heat treatment tool head is increased; and if the temperature of the machined surface is over the default temperature, the power of the laser surface heat treatment tool head is decreased.

In one embodiment of the present invention, the hybrid CNC machining center further comprises a contact or non-contact type detecting tool head, which is configured to detect a completeness of the cladded machined surface, wherein if the completeness of the cladded machined surface is achieved, a following step is processed; and if the completeness of the cladded machined surface is not achieved, a cladding operation is processed again.

As mentioned above, by using the above-mentioned hybrid CNC machining center and a machining method thereof, users can accomplish cutting, laser cladding, and/or laser surface heat treatment operations for a work-piece just in one single machine, so that the work-piece is unnecessary to be moved between different machines. Therefore, the steps and the process time of the machining operations are substantially simplified.

DETAILED DESCRIPTION OF THE PREFERRED EMBODIMENTS

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inside, outer, side, etc., are only directions with reference to the accompanying drawings, so that the used directional terms are used to describe and understand the present invention, but the present invention is not limited thereto.

A computer numerical control (CNC) machining center in the present invention can be a CNC machine tool, which has a single machining axial direction or a plurality of machining axial directions, and comprises at least an automatic tool change (ATC) system to contain a plurality of machining tool heads, such as a five-axis milling/lathing machining center, not limited in the present invention. A structure of a hybrid CNC machining center and a machining method thereof according to the present invention are described in detail below.

Figure 1:
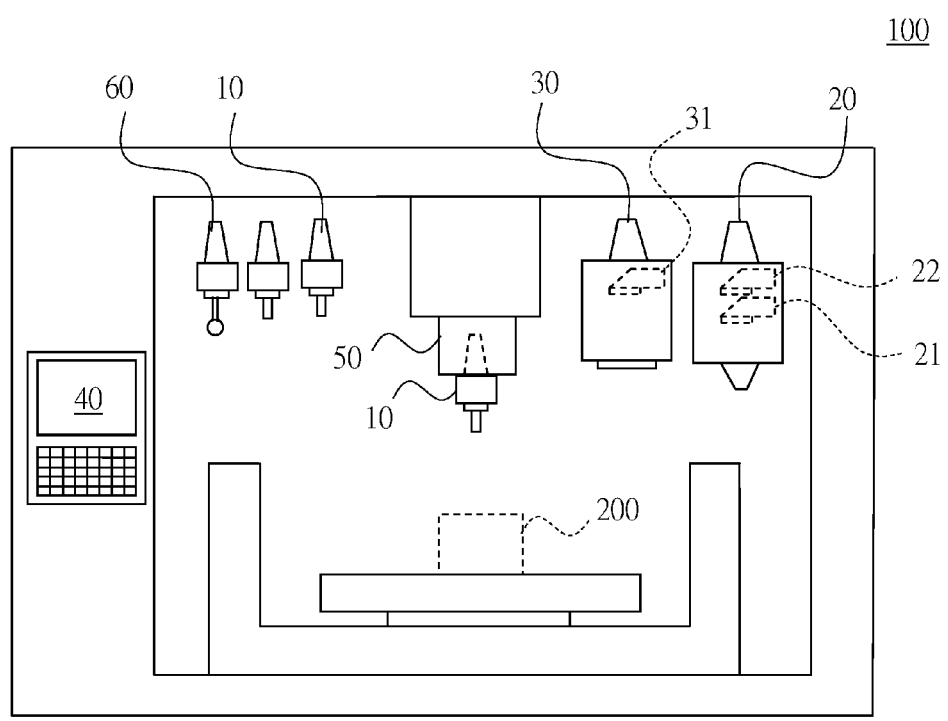
FIG. 1 is a schematic structural view of a hybrid computer numerical control (CNC) machining center according to a first embodiment of the present invention.
Figure 2:
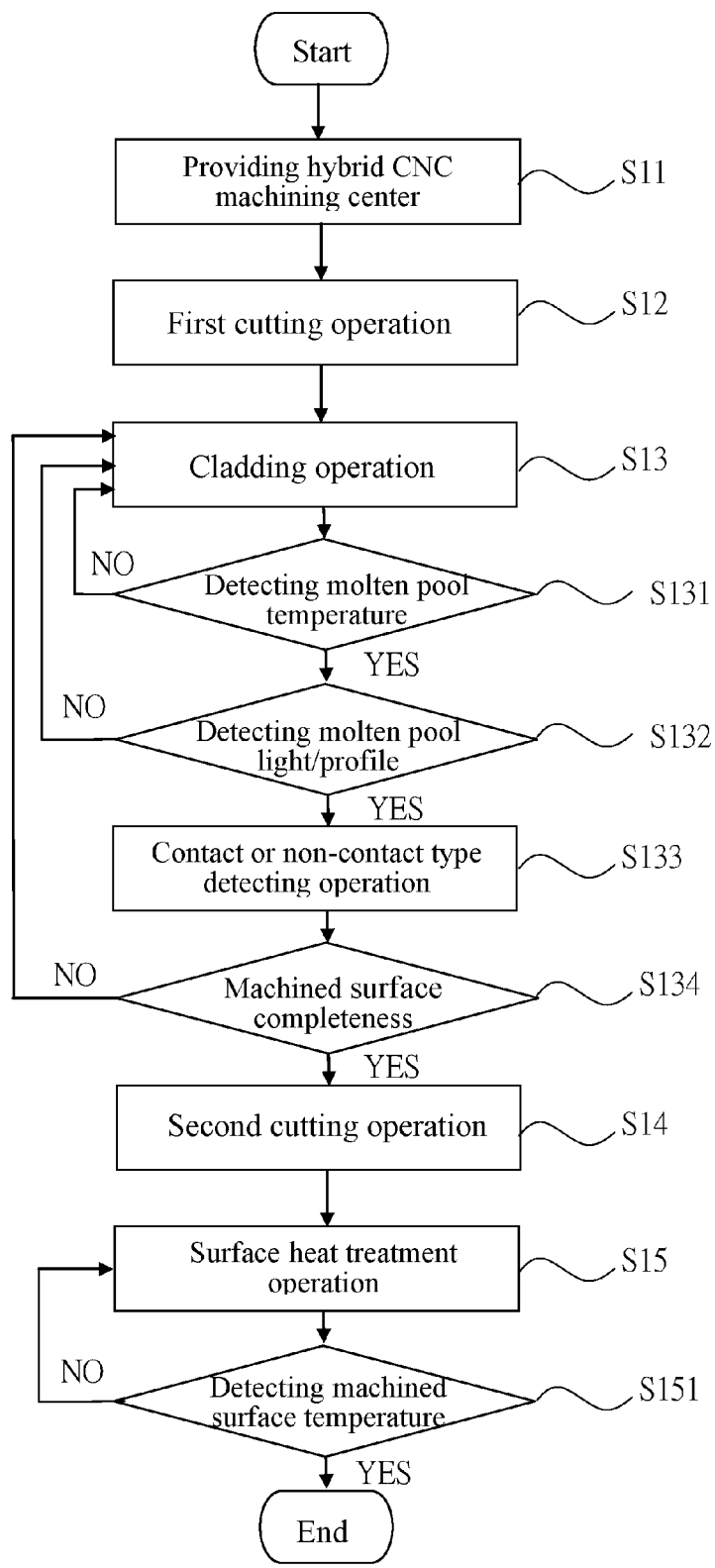
FIG. 2 is a flow chart of a machining method of the hybrid CNC machining center according to the first embodiment of the present invention.

Refer now to FIGS. 1 and 2, wherein FIG. 1 is a schematic structural view of a hybrid CNC machining center according to a first embodiment of the present invention; and FIG. 2 is a flow chart of a machining method of the hybrid CNC machining center according to the first embodiment of the present invention. A hybrid CNC machining center 100 according to the present invention comprises: at least a cutting tool head 10, a laser cladding tool head 20, a laser surface heat treatment tool head 30, and a computer numerical control unit 40, wherein the cutting tool head 10, the laser cladding tool head 20 and the laser surface heat treatment tool head 30 are alternately installed in a tool holder 50 of the hybrid CNC machining center 100. The cutting tool head 10 is configured to cut at least a machined surface of a work-piece 200; the laser cladding tool head 20 is configured to clad the machined surface; and the laser surface heat treatment tool head 30 is configured to heat treat the machined surface.

For more detailed description, the cutting tool head 10 can be a milling or lathing machining tool head, which belongs to a subtractive metal machining method; the laser cladding tool head 20 is adopted a laser cladding metal machining method, which belongs to an additive metal machining method, by using an additive manufacturing principle to add material, which using a laser beam to melt metal powder to stack material, so that it can be applied to a direct manufacture or a defect repair in mode and aviation blade fields; and the laser surface heat treatment tool head 30 is adopted a laser to emit on a partial metal machined surface to achieve an effect of metal heat treatment, which is a surface quality improving technology, so as to process a surface heat treatment, so that a hardness or quality adjustment of a surface of a machine assembly is increased, and it also can be applied to a heat treatment for a surface of a component, so as to increase hardness thereof to against wear and tear. The laser cladding tool head 20 and the laser surface heat treatment tool head 30 can be connected to an exterior laser source (not shown) through a hose (not shown), respectively. In the hose, an optical fiber assembly is disposed therein, so as to transmit a laser beam, also a needed material, to the laser cladding tool head 20 and the laser surface heat treatment tool head 30.

Refer now to FIGS. 1 and 2. A machining method of the hybrid CNC machining center according to the first embodiment of the present invention comprises steps of:

S11: providing a hybrid CNC machining center 100 including at least a cutting tool head 10, a laser cladding tool head 20, a laser surface heat treatment tool head 30, and a computer numerical control unit 40, wherein the cutting tool head 10, the laser cladding tool head 20 and the laser surface heat treatment tool head 30 are alternately installed in a tool holder 50 of the hybrid CNC machining center 100;

S12: processing a first cutting operation, wherein the cutting tool head 10 is configured to cut at least a machined surface of a work-piece 200;

S13: processing a cladding operation, wherein the laser cladding tool head 20 is configured to clad the machined surface;

S14: processing a second cutting operation, wherein the cutting tool head 10 is configured to cut the cladded machined surface; and S15: processing a surface heat treatment operation, wherein the laser surface heat treatment tool head 30 is configured to heat treat the machined surface.

Figure 3A:
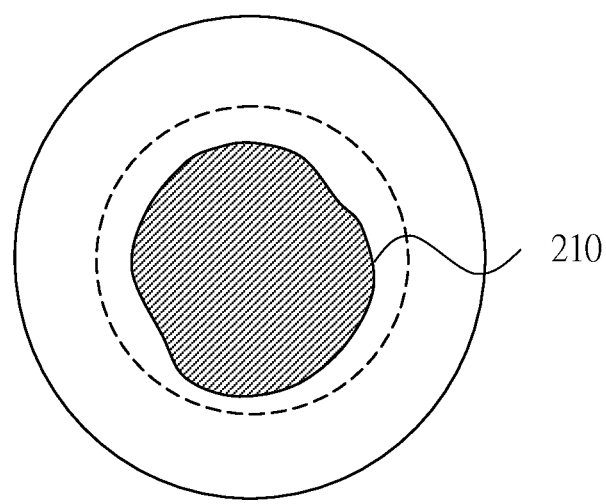
FIGS. 3A-3B are schematic views showing a lightness and profile of a molten pool are detected in the first embodiment of the present invention.
Figure 3B:
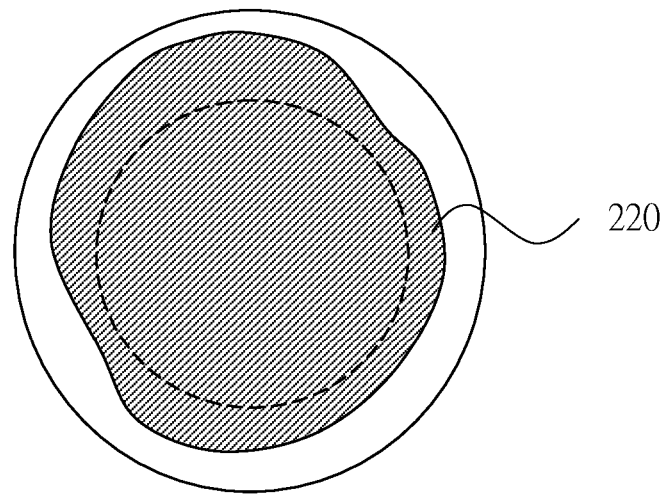

Preferably, the laser cladding tool head 20 further includes a temperature sensor 21 and a camera 22; and the cladding operation further includes a detecting step of a temperature of a molten pool S131 and a detecting step of a lightness and profile of the molten pool S132. During the step of processing the cladding operation S13, firstly detect a temperature of a molten pool of the machined surface by the temperature sensor 21, and provide the detected temperature of the molten pool to the computer numerical control unit 40. If the temperature of the molten pool is under a default temperature, a power of the laser cladding tool head 20 is increased; and if the temperature of the molten pool is over the default temperature, the power of the laser cladding tool head 20 is decreased. Then detect a lightness and profile of the molten pool of the machined surface by the camera 22, and provide the detected lightness and profile of the molten pool to the computer numerical control unit 40. If the lightness and profile of the molten pool is under a default condition (as shown in FIG. 3A, showing a profile 210 of the molten pool is detected by the camera 22, wherein a dotted line indicates a default size of the molten pool), the power of the laser cladding tool head 20 is increased; and if the lightness and profile of the molten pool is over the default condition (as shown in FIG. 3B, showing a profile 220 of the molten pool is detected by the camera 22, wherein a dotted line indicates the default size of the molten pool), the power of the laser cladding tool head 20 is decreased.

Preferably, the hybrid CNC machining center further comprises a contact or non-contact type detecting tool head

60; and the cladding operation further includes a contact or non-contact type detecting operation S133. If a completeness of the cladded machined surface is achieved, a following step is processed; and if the completeness of the cladded machined surface is not achieved, a cladding operation (step S134) is processed again.

Preferably, the laser surface heat treatment tool head 30 further includes a temperature sensor 31, and the surface heat treatment operation S15 further includes a detecting step of a temperature of a machined surface. During the step of processing the heat treatment operation S15, detect a temperature of the machined surface by the temperature sensor 31, and provide the detected temperature of the machined surface to the computer numerical control unit 40. If the temperature of the machined surface is under a default temperature, a power of the laser surface heat treatment tool head 30 is increased; and if the temperature of the machined surface is over the default temperature, the power of the laser surface heat treatment tool head 30 is decreased.

As mentioned above, the hybrid CNC machining center 100 according to the first embodiment of the present invention simultaneously includes the cutting tool head 10, the laser cladding tool head 20, and the laser surface heat treatment tool head 30, so that it can alternately process machining operations. For example, when a mode is partially damaged to be repaired, firstly cut the damaged place to be flat in the first cutting operation of S12; then add enough volume of the mode in the cladding operation of S13; next finish the repair of the mode in the second cutting operation of S14; and process a partial surface heat treatment in the surface heat treatment operation of S15. Hence, users can accomplish cutting, laser cladding, and laser surface heat treatment operations for the work-piece just in one single machine, so that the work-piece is unnecessary to be moved between different machines. Therefore, the steps and the process time of the machining operations are substantially simplified.

Additionally, the hybrid CNC machining center 100 according to the first embodiment of the present invention simultaneously includes the temperature sensor 21 and the camera 22, so that it can detect the temperature, lightness and profile of the molten pool, and provide these to the computer numerical control unit 40 to process a feedback control. Therefore, the machining effect and quality of the work-piece are further increased.

Figure 4:
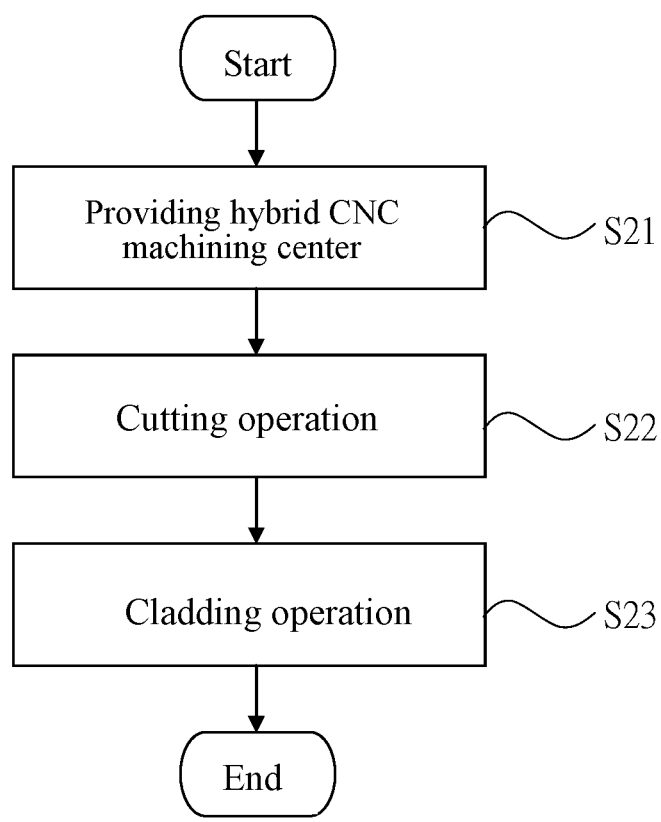
FIG. 4 is a flow chart of a machining method of a hybrid CNC machining center according to a second embodiment of the present invention.

Refer now to FIG. 4, which is a flow chart of a machining method of a hybrid CNC machining center according to a second embodiment of the present invention. A machining method of the hybrid CNC machining center according to the second embodiment of the present invention comprises steps of:

S21: providing a hybrid CNC machining center 100 including at least a cutting tool head 10, a laser cladding tool head 20, and a computer numerical control unit 40, wherein the cutting tool head 10 and the laser cladding tool head 20 are alternately installed in a tool holder 50 of the hybrid CNC machining center 100;

S22: processing a cutting operation, wherein the cutting tool head 10 is configured to cut at least a machined surface of a work-piece 200; and

S23: processing a cladding operation, wherein the laser cladding tool head 20 is configured to clad the machined surface;

By the above-mentioned machining method, users can accomplish cutting and laser cladding operations for the work-piece just in one single machine, so that the work-piece is unnecessary to be moved between different machines. Therefore, the steps and the process time of the machining operations are substantially simplified. Furthermore, users can flexibly add any other step in the machining method according to the first embodiment of the present invention, so as to increase the machining effect and quality.

Figure 5:
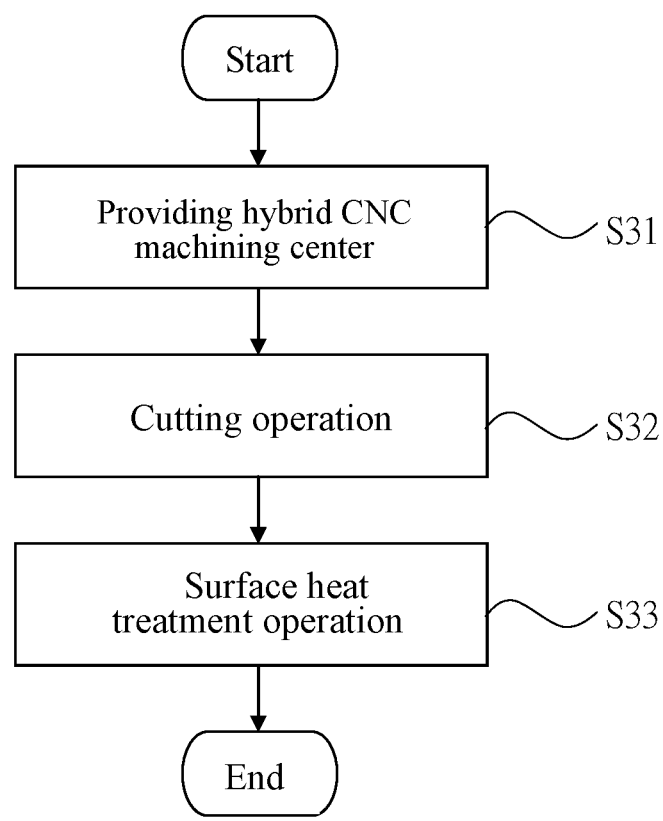
FIG. 5 is a flow chart of a machining method of a hybrid CNC machining center according to a third embodiment of the present invention.

Refer now to FIG. 5, which is a flow chart of a machining method of a hybrid CNC machining center according to a third embodiment of the present invention. A machining method of the hybrid CNC machining center according to the third embodiment of the present invention comprises steps of:

S31: providing a hybrid CNC machining center 100 including at least a cutting tool head 10, a laser surface heat treatment tool head 30, and a computer numerical control unit 40, wherein the cutting tool head 10 and the laser surface heat treatment tool head 30 are alternately installed in a tool holder 50 of the hybrid CNC machining center 100;

S32: processing a cutting operation, wherein the cutting tool head 10 is configured to cut at least a machined surface of a work-piece 200; and

S33: processing a surface heat treatment operation, wherein the laser surface heat treatment tool head 30 is configured to heat treat the machined surface.

By the above-mentioned machining method, users can accomplish cutting and laser cladding operations for the work-piece just in one single machine, so that the work-piece is unnecessary to be moved between different machines. Therefore, the steps and the process time of the machining operations are substantially simplified. Furthermore, users can flexibly add any other step in the machining method according to the first embodiment of the present invention, so as to increase the machining effect and quality.

By the above-mentioned hybrid CNC machining center and a machining method thereof, users can accomplish cutting, laser cladding, and/or laser surface heat treatment operations for a work-piece just in one single machine, so that the work-piece is unnecessary to be moved between different machines. Therefore, the steps and the process time of the machining operations are substantially simplified.

The present invention has been described with preferred embodiments thereof and it is understood that many changes and modifications to the described embodiment can be carried out without departing from the scope and the spirit of the invention that is intended to be limited only by the appended claims.

What is claimed is:

1. A machining method of a hybrid computer numerical control (CNC) machining center, comprising steps of:
    providing a hybrid CNC machining center including at least a cutting tool head, a laser cladding tool head, a laser surface heat treatment tool head, and a computer numerical control unit, wherein the cutting tool head, the laser cladding tool head and the laser surface heat treatment tool head are alternately installed in a tool holder of the hybrid CNC machining center, wherein the laser cladding tool head further includes a temperature sensor and a camera;
    processing a first cutting operation, wherein the cutting tool head is configured to cut at least a machined surface of a work-piece;
    processing a cladding operation, wherein the laser cladding tool head is configured to clad the machined surface, and at the same time, firstly detecting a temperature of a molten pool of the machined surface by the temperature sensor, and providing the detected temperature of the molten pool to the computer numerical control unit, wherein if the temperature of the molten pool is under a default temperature, a power of the laser cladding tool head is increased; and if the temperature of the molten pool is over the default temperature, the power of the laser cladding tool head is decreased; and then detecting a lightness and profile of the molten pool of the machined surface by the camera, and providing the detected lightness and profile of the molten pool to the computer numerical control unit, wherein if the lightness and profile of the molten pool is under a default condition, the power of the laser cladding tool head is increased; and if the lightness and profile of the molten pool is over the default condition, the power of the laser cladding tool head is decreased;

processing a second cutting operation, wherein the cutting tool head is configured to cut the cladded machined surface; and processing a surface heat treatment operation, wherein the laser surface heat treatment tool head is configured to heat treat the machined surface.

2. The machining method according to claim 1, wherein the hybrid CNC machining center further comprises a contact or non-contact type detecting tool head, which is configured to detect a completeness of the cladded machined surface, wherein if the completeness of the cladded machined surface is achieved, a following step is processed; and if the completeness of the cladded machined surface is not achieved, the cladding operation is processed again.

3. A machining method of a hybrid CNC machining center, comprising steps of:

providing a hybrid CNC machining center including at least a cutting tool head, a laser cladding tool head, and a computer numerical control unit, wherein the cutting tool head and the laser cladding tool head are alternately installed in a tool holder of the hybrid CNC machining center, wherein the laser cladding tool head further includes a temperature sensor and a camera;

processing a cutting operation, wherein the cutting tool head is configured to cut at least a machined surface of a work-piece; and processing a cladding operation, wherein the laser cladding tool head is configured to clad the machined surface, and at the same time, firstly detecting a temperature of a molten pool of the machined surface by the temperature sensor, and providing the detected temperature of the molten pool to the computer numerical control unit, wherein if the temperature of the molten pool is under a default temperature, a power of the laser cladding tool head is increased; and if the temperature of the molten pool is over the default temperature, the power of the laser cladding tool head is decreased; and then detecting a lightness and profile of the molten pool of the machined surface by the camera, and providing the detected lightness and profile of the molten pool to the computer numerical control unit, wherein if the lightness and profile of the molten pool is under a default condition, the power of the laser cladding tool head is increased; and if the lightness and profile of the molten pool is over the default condition, the power of the laser cladding tool head is decreased.

4. The machining method according to claim 3, wherein the hybrid CNC machining center further comprises a contact or non-contact type detecting tool head, which is configured to detect a completeness of the cladded machined surface, wherein if the completeness of the cladded machined surface is achieved, the following step is processed; and if the completeness of the cladded machined surface is not achieved, the cladding operation is processed again.

5. The machining method according to claim 3, wherein the hybrid CNC machining center further comprises a laser surface heat treatment tool head, which is configured to process a surface heat treatment operation to the cladded machined surface after the cladding operation.

6. A hybrid CNC machining center, comprising: at least a cutting tool head, a laser cladding tool head, a laser surface heat treatment tool head, and a computer numerical control unit, wherein the cutting tool head, the laser cladding tool head and the laser surface heat treatment tool head are alternately installed in a tool holder of the hybrid CNC machining center; and wherein the cutting tool head is configured to cut at least a machined surface of a work-piece; the laser cladding tool head is configured to clad the machined surface; and the laser surface heat treatment tool head is configured to heat treat the machined surface;

wherein the laser cladding tool head further includes a temperature sensor and a camera; and during processing a cladding operation, the temperature sensor firstly detects a temperature of a molten pool of the machined surface, and the camera detects a lightness and profile of the molten pool of the machined surface, and the detected temperature, the detected lightness and profile of the molten pool are provided to the computer numerical control unit, so as to adjust the power of the laser cladding tool head.

7. The hybrid CNC machining center according to claim 6, wherein during processing a cladding operation, the temperature sensor firstly detects a temperature of a molten pool of the machined surface, and if the temperature of the molten pool is under a default temperature, a power of the laser cladding tool head is increased; and if the temperature of the molten pool is over the default temperature, the power of the laser cladding tool head is decreased; and the camera then detects a lightness and profile of the molten pool of the machined surface, and if the lightness and profile of the molten pool is under a default condition, a power of the laser cladding tool head is increased; and if the lightness and profile of the molten pool is over the default condition, the power of the laser cladding tool head is decreased.

8. The hybrid CNC machining center according to claim 6, wherein the hybrid CNC machining center further comprises a contact or non-contact type detecting tool head, which is configured to detect a completeness of the cladded machined surface, wherein if the completeness of the cladded machined surface is achieved, a following step is processed; and if the completeness of the cladded machined surface is not achieved, a cladding operation is processed again.

* * * * *